United States Patent
Hogg

(10) Patent No.: US 11,594,089 B2
(45) Date of Patent: Feb. 28, 2023

(54) TOUCHLESS MOTION SENSOR SYSTEMS FOR PERFORMING DIRECTIONAL DETECTION AND FOR PROVIDING ACCESS CONTROL

(71) Applicant: Essex Electronics, Inc., Carpinteria, CA (US)

(72) Inventor: Robert D Hogg, Santa Barbara, CA (US)

(73) Assignee: Essex Electronics, Inc, Carpenteria, CA (US)

( * ) Notice: Subject to any disclaimer, the term of this patent is extended or adjusted under 35 U.S.C. 154(b) by 168 days.

(21) Appl. No.: 17/233,196

(22) Filed: Apr. 16, 2021

(65) Prior Publication Data
US 2022/0335762 A1  Oct. 20, 2022

(51) Int. Cl.
*G07C 9/00* (2020.01)

(52) U.S. Cl.
CPC ..... *G07C 9/00904* (2013.01); *G07C 9/00182* (2013.01); *G07C 9/00944* (2013.01); *G07C 2009/0096* (2013.01); *G07C 2209/08* (2013.01)

(58) Field of Classification Search
CPC ............ G07C 9/00904; G07C 9/00182; G07C 9/00944; G07C 2009/0096; G07C 2209/08
See application file for complete search history.

(56) References Cited

U.S. PATENT DOCUMENTS

| | | | | |
|---|---|---|---|---|
| 3,852,592 A * | 12/1974 | Scoville | ................... | E05F 15/73 250/221 |
| 4,577,437 A * | 3/1986 | Gionet | ..................... | E05F 15/73 49/25 |
| 4,815,046 A * | 3/1989 | Dorr | ....................... | G01S 15/87 367/95 |
| 4,851,746 A * | 7/1989 | Milke | ..................... | G01S 17/04 318/467 |
| 4,967,083 A * | 10/1990 | Kornbrekke | ............ | G01S 17/50 250/221 |
| 5,453,736 A * | 9/1995 | Noren | ................... | G05B 19/409 49/31 |
| 5,828,302 A * | 10/1998 | Tsutsumi | ................ | E05F 15/43 49/31 |
| 5,963,000 A * | 10/1999 | Tsutsumi | ................ | E05F 15/43 250/221 |
| 6,970,085 B2 * | 11/2005 | Okabe | ..................... | E05F 15/74 340/545.1 |
| 8,510,990 B2 * | 8/2013 | Agam | ..................... | E05F 15/73 49/28 |
| 8,994,229 B2 * | 3/2015 | Blair | ..................... | H03K 17/94 340/545.1 |
| 9,212,028 B2 * | 12/2015 | Novak | ..................... | B66B 13/26 |
| 9,751,727 B1 * | 9/2017 | Novak | ..................... | B66B 13/26 |
| 11,282,319 B2 * | 3/2022 | Hewitt | ............... | G07C 9/00571 |

(Continued)

*Primary Examiner* — Curtis J King
(74) *Attorney, Agent, or Firm* — Kenneth D'Alessandro

(57) ABSTRACT

A touchless motion sensor system for performing directional motion detection includes first and second touchless motion sensors. First and second sensing units are coupled to the first and second touchless motion sensors each having a sensing unit disable input, a sensing unit disable output, a sensing unit to sensing unit motion detected output, and motion logic. The first sensing unit disable output is coupled to the second sensing unit disable input, and the second sensing unit disable output is coupled to the first sensing unit disable input.

19 Claims, 5 Drawing Sheets

(56) References Cited

U.S. PATENT DOCUMENTS

| | | | |
|---|---|---|---|
| 2002/0036476 A1* | 3/2002 | Zengguang | G01S 17/04 340/556 |
| 2003/0222785 A1* | 12/2003 | Weinstein Ide | A47K 17/00 340/541 |
| 2004/0100386 A1* | 5/2004 | Tendler | G07C 9/00182 340/573.3 |
| 2006/0267780 A1* | 11/2006 | Adams | A61B 5/1113 340/562 |
| 2007/0008124 A1* | 1/2007 | Stadler | E05F 15/43 340/545.1 |
| 2007/0126696 A1* | 6/2007 | Boillot | G06F 3/04847 345/156 |
| 2007/0130547 A1* | 6/2007 | Boillot | G06F 21/36 715/863 |
| 2007/0211023 A1* | 9/2007 | Boillot | G06F 3/04886 345/156 |
| 2008/0048878 A1* | 2/2008 | Boillot | G06F 3/0485 381/105 |
| 2008/0055247 A1* | 3/2008 | Boillot | G06F 3/038 345/158 |
| 2008/0059915 A1* | 3/2008 | Boillot | G06F 3/0481 715/863 |
| 2008/0100572 A1* | 5/2008 | Boillot | G06F 3/04883 345/158 |
| 2008/0157964 A1* | 7/2008 | Eskildsen | G08B 13/08 340/545.1 |
| 2008/0252595 A1* | 10/2008 | Boillot | G06F 3/038 704/251 |
| 2008/0284726 A1* | 11/2008 | Boillot | G06F 3/0383 345/156 |
| 2009/0160660 A1* | 6/2009 | Nurmela | G08B 21/0423 340/573.4 |
| 2010/0253516 A1* | 10/2010 | Lemerand | E05F 15/73 340/545.1 |
| 2011/0181412 A1* | 7/2011 | Alexander | G05B 19/042 340/541 |
| 2014/0035749 A1* | 2/2014 | Reed, Jr. | A61B 5/1115 29/825 |
| 2014/0340227 A1* | 11/2014 | Reed, Jr. | A61B 5/6889 340/573.1 |
| 2014/0380249 A1* | 12/2014 | Fleizach | G06F 3/017 715/863 |
| 2015/0130608 A1* | 5/2015 | Sharma | G08B 25/008 340/501 |
| 2016/0077532 A1* | 3/2016 | Lagerstedt | H04W 4/33 700/277 |
| 2017/0247926 A1* | 8/2017 | Elie | E05F 15/40 |
| 2018/0267617 A1* | 9/2018 | Giannuzzi | G06V 40/113 |
| 2019/0304228 A1* | 10/2019 | Trundle | G06Q 50/163 |
| 2020/0024882 A1* | 1/2020 | Emrich | G08B 21/02 |
| 2020/0333271 A1* | 10/2020 | Hendrich | H01J 37/285 |
| 2021/0110700 A1* | 4/2021 | Harman | G06V 20/46 |
| 2021/0355739 A1* | 11/2021 | Tulsidas | G06V 40/172 |
| 2021/0363811 A1* | 11/2021 | Subramanian | E05F 15/40 |
| 2022/0042365 A1* | 2/2022 | Sripathi | E05B 65/0035 |
| 2022/0120618 A1* | 4/2022 | Ellison | A61B 5/7495 |
| 2022/0136305 A1* | 5/2022 | Elwine | E05B 65/0035 49/334 |
| 2022/0189298 A1* | 6/2022 | Goeders | G09F 27/005 |
| 2022/0275960 A1* | 9/2022 | Cheng | H05B 47/175 |
| 2022/0309906 A1* | 9/2022 | Rees | G08B 21/245 |
| 2022/0319261 A1* | 10/2022 | Dabel | G07C 9/00714 |
| 2022/0324676 A1* | 10/2022 | Nikovski | B66B 1/3407 |

* cited by examiner

TOUCHLESS MOTION SENSOR SYSTEMS FOR PERFORMING DIRECTIONAL DETECTION AND FOR PROVIDING ACCESS CONTROL

The present invention relates to touchless motion sensors. More particularly, the present invention relates to touchless motion sensor systems for directional detection and access control.

BACKGROUND

In certain environments, it is desired to operate doors and other mechanical systems without needing the user to touch control surfaces. One example is operating doors and other mechanical systems within hospitals and other medical facilities. Another example is a need to maintain hygiene while operating doors and other mechanical systems in public areas. There is room for improvement in operating doors and other mechanical systems in such environments.

BRIEF DESCRIPTION

According to an embodiment of the invention, a touchless motion sensor system for performing directional motion detection includes a first touchless motion sensor having an output, a first sensing unit coupled to the first touchless motion sensor, the first sensing unit including a first sensing unit disable input, a first sensing unit disable output, a first sensing unit to second sensing unit motion detected output, and motion logic coupled to the output of the first touchless motion sensor, the first sensing unit disable input, and to the first sensing unit to second sensing unit motion detected output, a second touchless motion sensor having an output, the second touchless motion sensor separated from the first touchless motion sensor by a predetermined distance along a predefined axis, a second sensing unit coupled to the second touchless motion sensor, the second sensing unit including a second sensing unit disable input, a second sensing unit disable output, a second sensing unit to first sensing unit motion detected output, and motion logic coupled to the output of the second touchless motion sensor, the second sensing unit disable input, and to the first sensing unit to second sensing unit motion detected output; the first sensing unit disable output coupled to the second sensing unit disable input, and the second sensing unit disable output coupled to the first sensing unit disable input.

According to an embodiment of the invention, the first sensing unit to second sensing unit motion detected output is a latched output, and the second sensing unit to first sensing unit motion detected output is a latched output.

According to an embodiment of the invention, the latched output of the first sensing unit to second sensing unit motion detected output is an output from a first flip flop, and the latched output of the second sensing unit to first sensing unit motion detected output is an output from a second flip flop.

According to an embodiment of the invention, the touchless motion sensor system of claim 3 further includes a common sensing unit reset input coupled to a reset input of the first flip flop and to a reset input of the second flip flop.

According to an embodiment of the invention, the predefined axis is aligned along one of a horizontal and a vertical direction.

According to an embodiment of the invention, a touchless motion sensor system for providing access control to a controlled space having a controllable access barrier includes a first touchless motion sensor disposed outside of the controlled space, the first touchless motion sensor having an output, a first sensing unit coupled to the first touchless motion sensor, the first sensing unit including a first sensing unit motion detected output, a second touchless motion sensor disposed within the controlled space, the second touchless motion sensor having an output, a second sensing unit coupled to the second touchless motion sensor, the second sensing unit including a first sensing unit motion detected output, a controller coupled to the first and second sensing units, the controller coupled to the controllable access barrier and configured to open the controlled access barrier in response to motion sensed by the first sensing unit only if the first sensing unit is enabled, then close the controllable access barrier in response to motion sensed by the second sensing unit, and open the controllable access barrier in response to motion sensed a second time by the second sensing unit.

According to an embodiment of the invention, the controller is further configured to set a controlled space occupied flag in response to the motion sensed by the second sensing unit, after opening the controllable access barrier in response to motion sensed a second time by the second sensing unit, close the controllable access barrier and enable the first sensing unit and clear the controlled space occupied flag.

According to an embodiment of the invention, the controlled space is a room and the controllable access barrier is a door providing access to the room.

According to an embodiment of the invention, a method for performing directional motion detection includes providing a first touchless motion sensor coupled to a first sensing unit, providing a second touchless motion sensor coupled to a second sensing unit, the second touchless motion sensor spaced apart from the first touchless motion sensor at a predetermined distance along the predetermined axis, sensing motion by one of the first and second touchless motion sensors first before sensing motion by the other one of the first and second touchless motion sensors, activating a first sensing unit to second sensing unit motion detector output of the first sensing unit and inhibiting a second sensing unit to first sensing unit motion detector output of the second sensing unit if the motion was sensed first by the first touchless motion sensor, and activating the second sensing unit to first sensing unit motion detector output of the second sensing unit and inhibiting the first sensing unit to second sensing unit motion detector output of the first sensing unit if the motion was sensed first by the second touchless motion sensor.

According to an embodiment of the invention, activating the first sensing unit to second sensing unit motion detector output of the first sensing unit and inhibiting the second sensing unit to first sensing unit motion detector output of the second sensing unit if the motion was sensed first by the first touchless motion sensor occurs only if the motion is sensed by the second touchless motion sensor within a predetermined time interval following the motion being sensed by the first touchless motion sensor, and activating the second sensing unit to first sensing unit motion detector output of the second sensing unit and inhibiting the first sensing unit to second sensing unit motion detector output of the first sensing unit if the motion was sensed first by the second touchless motion sensor occurs only if the motion is sensed by the first touchless motion sensor within a predetermined time interval following the motion being sensed by the second touchless motion sensor.

According to an embodiment of the invention, the predetermined time interval is less than 1 second.

According to an embodiment of the invention, the predetermined time interval is less than 10 seconds.

According to an embodiment of the invention, a method for providing access control to a controlled space includes providing a first touchless motion sensor coupled to a first sensing unit, the first touchless sensor disposed outside of the controlled space, providing a second touchless motion sensor coupled to a second sensing unit, the second touchless motion sensor disposed inside of the controlled space, sensing motion by the first touchless motion sensor, opening a controlled access barrier to the controlled space in response to the motion sensed by the first touchless motion sensor, sensing motion by the second touchless motion sensor after the controlled access barrier has been opened, closing the controlled access barrier in response to the motion sensed by the second touchless motion sensor, disabling control of the controlled access barrier from motion sensed by the first touchless motion detector after closing the controlled access barrier.

According to an embodiment of the invention, the method further includes sensing motion by the second touchless motion sensor after the controlled access barrier has been closed, opening the controlled access barrier in response to the motion sensed by the second touchless motion sensor after the controlled access barrier has been closed, closing the controlled access barrier following a preselected time delay following the opening of the controlled access barrier in response to the motion sensed by the second touchless motion sensor after the controlled access barrier has been closed in response to the motion sensed by the second touchless motion sensor, and enabling control of the controlled access barrier from motion sensed by the first touchless motion detector after closing the controlled access barrier following the preselected time delay.

According to an embodiment of the invention, The method of claim 13 further includes setting a controlled space occupied flag after closing the controlled access barrier in response to the motion sensed by the second touchless motion sensor.

According to an embodiment of the invention, the method further includes activating a controlled space occupied indicia in response to setting the controlled space occupied flag.

According to an embodiment of the invention, the method further includes setting a controlled space occupied flag after closing the controlled access barrier in response to the motion sensed by the second touchless motion sensor.

According to an embodiment of the invention, the method further includes clearing the controlled space occupied flag after closing the controlled access barrier following the preselected time delay.

According to an embodiment of the invention, the method further includes deactivating the controlled space occupied indicia in response to clearing the controlled space occupied flag.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description is illustrative only and not in any way limiting. Other embodiments will readily suggest themselves to such skilled persons.

In accordance with aspects of the present invention, touchless motion sensor systems are presented for performing directional detection and for providing access control.

Figure 1:
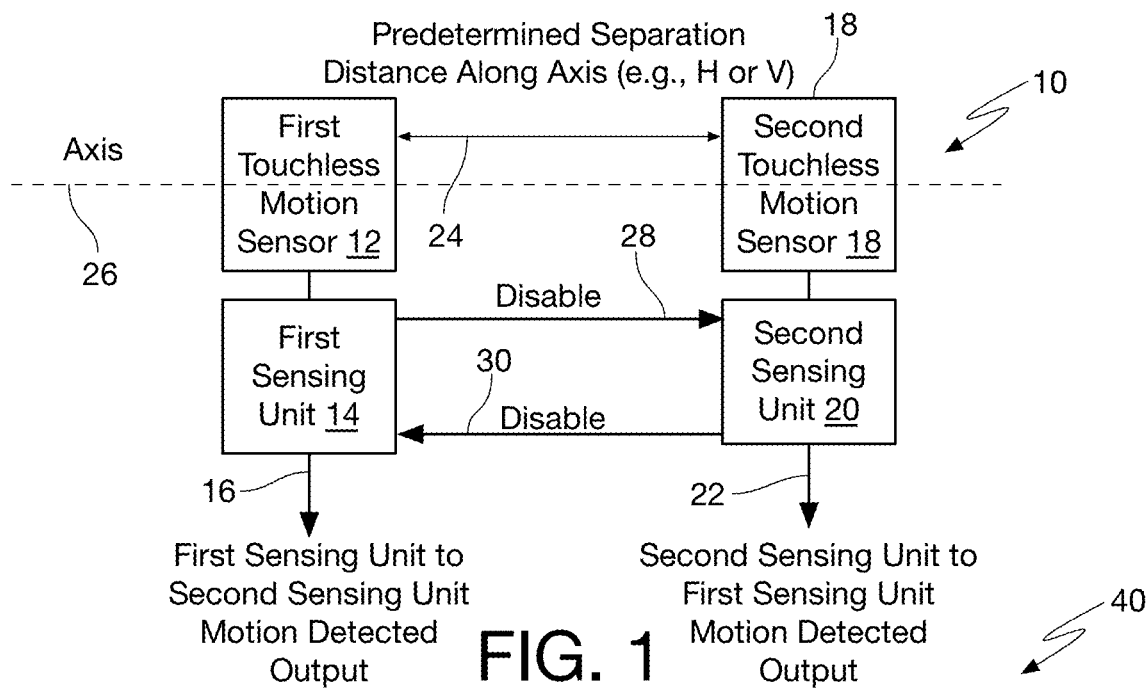
FIG. 1 is a block diagram of an illustrative touchless motion sensor circuit system for directional detection and control in accordance with an aspect of the present invention.

Referring now to FIG. 1, a block diagram shows an illustrative touchless motion sensor circuit system 10 for directional detection in accordance with an aspect of the present invention. A first touchless motion sensor 12 is coupled to a first Sensing Unit 14 having a First Sensing Unit to Second Sensing Unit (FSU-to-SSU) motion detected output 16. A second touchless motion sensor 18 is coupled to a second Sensing Unit 20 having a Second Sensing Unit to First Sensing Unit (SSU-to-FSU) motion detected output 22. The sensors 14 and 20 are touchless motion sensors.

The first Sensing Unit 14 is separated from the second Sensing Unit 20 by a predetermined separation distance indicated at arrows 24 along a predefined axis 26. The predetermined separation distance can vary depending on the application but may typically be from between fractions of an inch to more than a foot. As noted in FIG. 1, the separation distance is measured along the on-axis component of motion of an object to be sensed. Persons of ordinary skill in the art will appreciate that the predefined axis may be aligned in any spatial direction, such as in one of a horizontal or vertical direction, and that in some embodiments of the invention the predefined axis may be aligned in a direction other than a horizontal or a vertical direction.

The first Sensing Unit 14 includes a disable output 28 coupled to the second touchless motion sensor unit 18. The second Sensing Unit 20 includes a disable output 30 coupled to the first touchless motion sensor unit 14.

Figure 2:
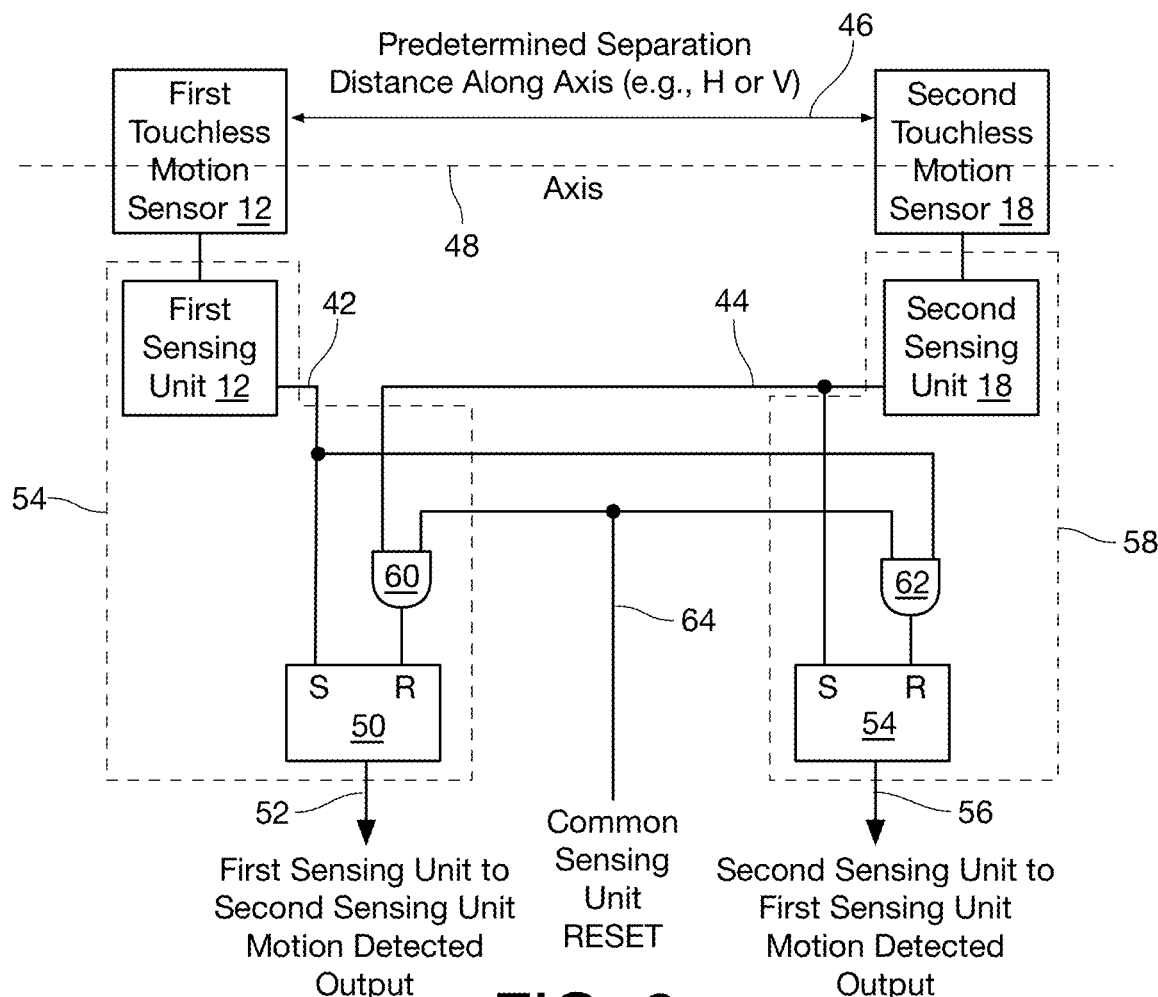
FIG. 2 is a block diagram of another illustrative touchless motion sensor circuit system for directional detection and control in accordance with an aspect of the present invention.

Referring now to FIG. 2, a block diagram shows another illustrative touchless motion sensor circuit system 40 for directional detection in accordance with an aspect of the present invention.

As in the embodiment of FIG. 1, the sensor circuit system 40 includes a first touchless motion sensor 12 is coupled to a first Sensing Unit 14 having a FSU-to-SSU motion detected output 16. A second touchless motion sensor 18 is coupled to a second Sensing Unit 20 having a (SSU-to-FSU) motion detected output 22.

The first Sensing Unit 14 is separated from the second Sensing Unit 20 by a predetermined separation distance indicated at arrows 46 along a predefined axis 44. The predetermined separation distance is measured along the on-axis component of motion of an object to be sensed. As noted in FIG. 2, persons of ordinary skill in the art will appreciate that the predefined axis may be aligned in any spatial direction, such as in one of a horizontal or vertical direction, and that in some embodiments of the invention the predefined axis may be aligned in a direction other than a horizontal or a vertical direction.

The motion detected output of the first Sensing Unit 14 at reference numeral 42 is coupled to the SET (S) input of a set-reset (SR) flip flop 50 associated with the first Sensing Unit 14. The output of the SR flip flop 50 is the First Sensing Unit to Second Sensing Unit motion detected output of the sensor circuit system 40 and is shown at reference numeral 52. In some embodiments, the SR flip flop 50 may be internal to the first Sensing Unit 12 as indicated by the dashed lines 54.

The motion detected output of the second Sensing Unit 20 at reference numeral 44 is coupled to the SET (S) input of SR flip flop 54 associated with the second Sensing Unit 20. The output of the SR flip flop 54 is the Second Sensing Unit to First Sensing Unit detected output of the sensor circuit system 40 and is shown at reference numeral 56. In some embodiments, the SR flip flop 54 may be internal to the second Sensing Unit 20 as indicated by the dashed lines 58.

The RESET (R) input of the SR flip flop 50 is coupled to the motion detected output of the second Sensing Unit 20 at reference numeral 44 through a first input of AND gate 60 and the RESET (R) input of the SR flip flop 54 is coupled to the motion detected output of the first Sensing Unit 14 at reference numeral 42 through a first input of AND gate 62. The second inputs to AND gates 60 and 60 are driven by a Sensor Unit RESET signal on line 64. The Sensor Unit RESET signal on line 64 is used to clear both the FSU-to-SSU motion detected output 52 and the SSU-to-FSU Motion Detected Output 56 of the sensor circuit system 40.

The connections to the SET and RESET inputs to the flip flops 50 and 54 assure that only one of the FSU-to-SSU motion detected output 52 and the SSU-to-FSU motion detected output 56 of the sensor circuit system 40 can be active at any one time.

Figure 3:
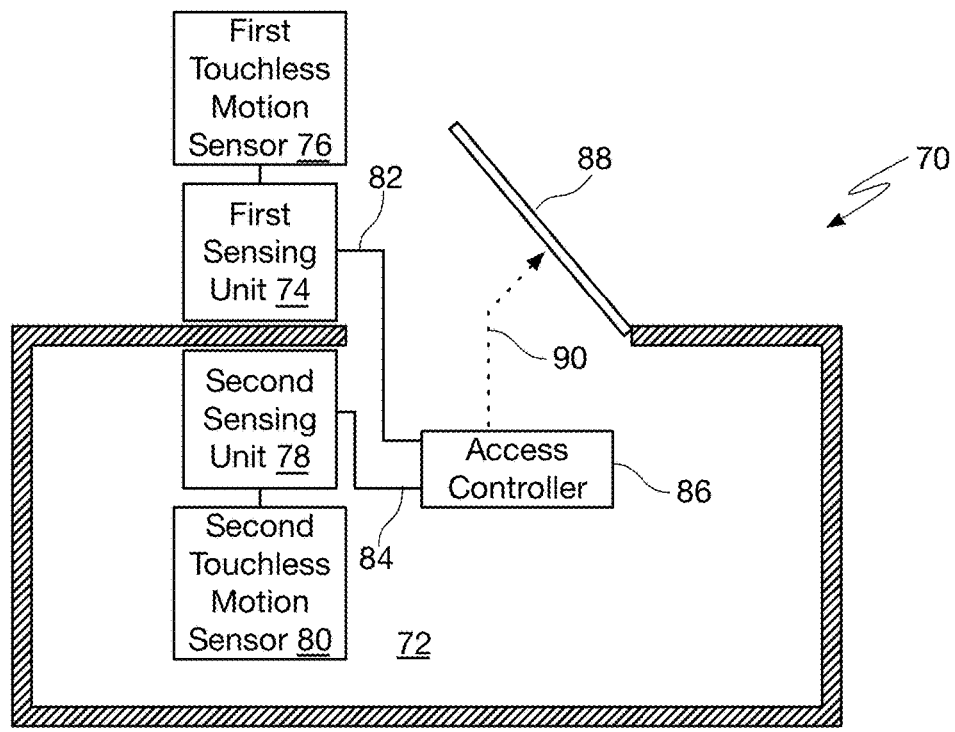
FIG. 3 is a block diagram of an illustrative touchless motion sensor circuit system for access control in accordance with an aspect of the present invention.

Referring now to FIG. 3, a block diagram shows an illustrative touchless motion sensor circuit system 70 to control access to a controlled space 72 in accordance with an aspect of the present invention.

A first Sensor Unit 74 is located outside of the controlled space 72 and includes a touchless motion sensor 76. A second Sensor Unit 78 is located inside of the controlled space 72 and includes a touchless motion sensor 80. The output at reference numeral 82 of the first Sensor Unit 74 and the output at reference numeral 84 of the second Sensor Unit 78 are connected to an access controller 86. The access controller 86 controls an access barrier 88, shown as a door in FIG. 3 via an electro-mechanical linkage 90, such as a solenoid or other linkage known in the art. An example of the operation of the touchless motion sensor circuit system 70 of FIG. 3 is discussed with reference to FIG. 7.

Figure 4:
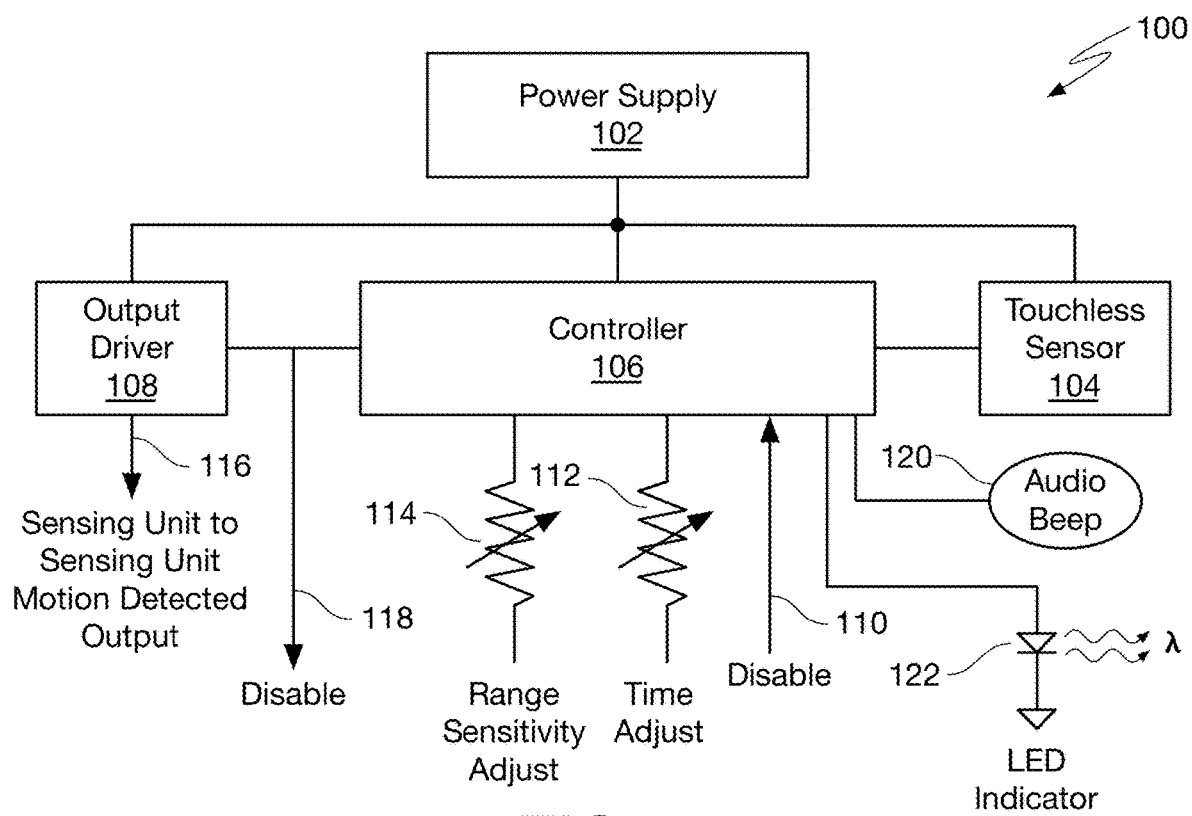
FIG. 4 is a block diagram of an illustrative touchless motion sensor that may be used in the present invention.

Referring now to FIG. 4, a block diagram shows an illustrative touchless motion sensor 100 that may be used in the present invention. A power supply 102 is used to provide power at an appropriate voltage and current drive capability to a touchless motion sensor 104, a controller 106, and an output driver 108.

The touchless motion sensor 104 may be one of a microwave doppler detector, sometimes referred to as a field disturbance sensor, a capacitive touchless motion sensor, or an infrared detector. Other touchless motion sensor types may be used in the present invention.

The controller 106 may be a microcontroller or state machine. The output driver 108 may be a mechanical or solid state relay, or another device that provides current or voltage drive to a device, such as a door or gate, being controlled.

The controller 106 receives input from the touchless motion sensor 104. The controller 106 also includes a disable input, 110, a time adjust input 112 for setting a time during which the output driver circuit 108 will be enabled, and a range sensitivity adjustment input used to calibrate when action is to be taken in response to an output signal from the touchless motion sensor. Provision and setting of these adjustments will depend on the particular touchless motion sensor 104 that is used as well as on the particular device, such as a door or gate, that is being controlled, and is well within the level of skill in the art.

The output driver 108 provides a sensing unit to sensing unit motion detected output at reference numeral 116. In the example embodiment depicted in FIG. 4, a disable output is shown at reference numeral 118 as being taken from the signal from the controller 106 that drives the output driver 106. Persons of ordinary skill in the art will appreciate that the disable output could be common with the sensing unit to sensing unit motion detected output at reference numeral 116.

The controller 106 may also optionally include outputs to drive one or more output indicators, such as an audible beep transducer 120 and a LED indicator 122. Provision of such one or more indicators is well known in the art.

Figure 5:
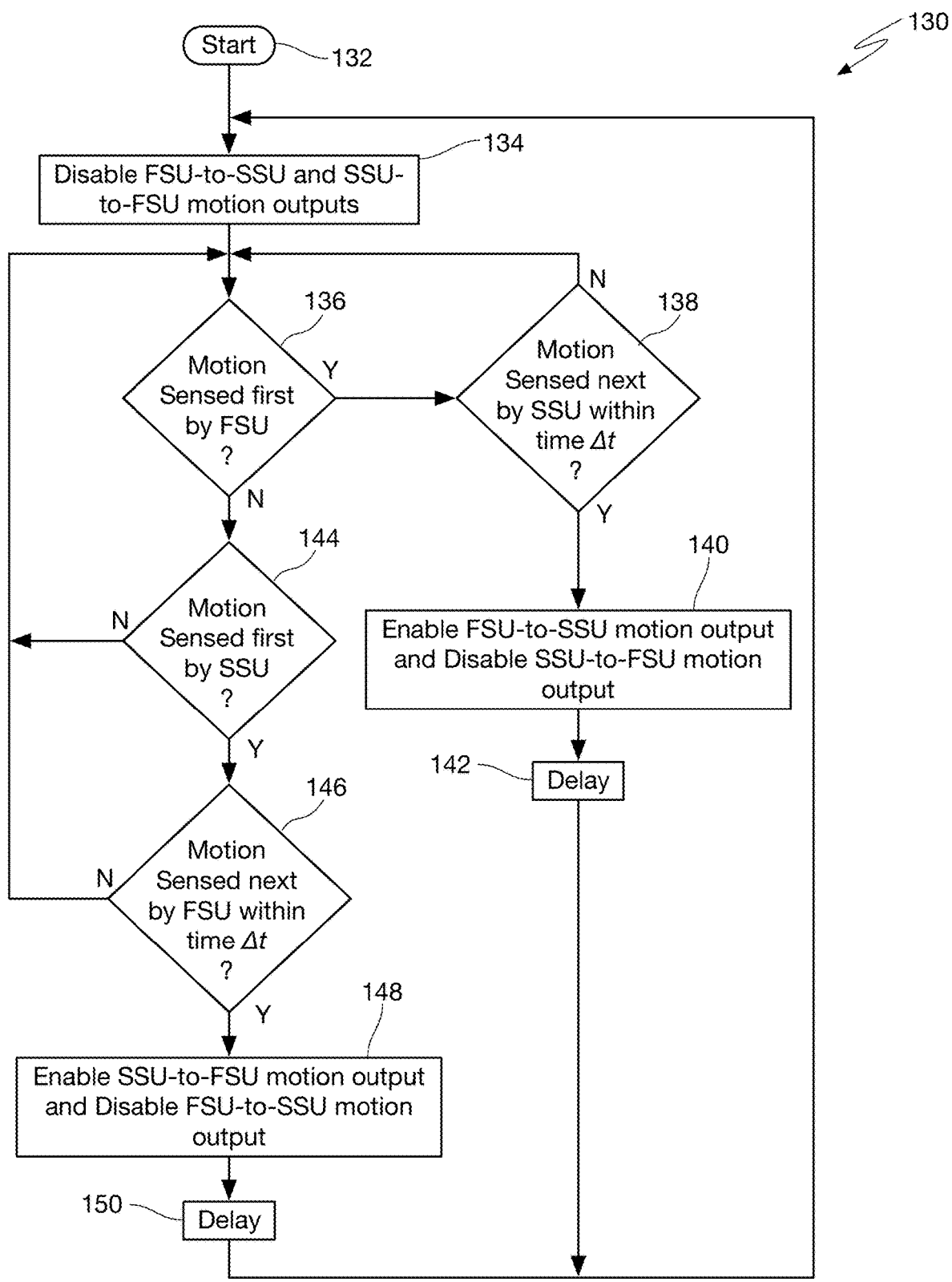
FIG. 5 is a flow diagram showing an illustrative method for performing directional detection and control in accordance with an aspect of the present invention.

Referring now to FIG. 5, a flow diagram shows an illustrative method 130 for performing directional detection in accordance with an aspect of the present invention. The method 130 determines whether an object is moving in a first direction from the first Sensing Unit (FSU) 14 of FIG. 2 and FIG. 2 to the second Sensing Unit (SSU) 20 of FIG. 1 or FIG. 2 or in a second direction from the second Sensing Unit 20 to the first Sensing Unit 14. The method starts at reference numeral 132.

At reference numeral 134, FSU-to-SSU and SSU-to-FSU motion detected outputs are disabled. In the embodiment shown in FIG. 2, this may be accomplished by asserting a Sensor Unit RESET signal on line 64.

At reference numeral 136 a decision is made whether or not the touchless motion sensor in the first Sensing Unit 14 has detected the motion of an object within a sensing range of the first touchless motion sensor 12 coupled to the first Sensing Unit 14. If so, the method proceeds to reference numeral 138 where it is determined whether motion of the object is next sensed by the second touchless motion sensor 18 coupled to the second Sensing Unit 20 within a predetermined time period Δt. The predetermined time period Δt is provided to minimize or eliminate false triggering by requiring that the motion of the object be sensed by the second touchless motion sensor 18 in the second Sensing Unit 20 during an interval which corresponds to a deliberate action. For example, if the deliberate action is a hand waving across the sensors, the predetermined time period Δt will usually be less than 1 second. If the deliberate action is motion of a person toward a door or gate, the predetermined time period Δt will usually be less than 10 seconds, depending on the spacing between the first sensing Unit 14 and the second Sensing Unit 20.

If motion of the object is not sensed by the second touchless motion sensor 18 in the second Sensing Unit 20 within the predetermined time period Δt, the sensing by the first Sensing Unit 14 is determined to be a false sensing and the method returns to reference numeral 136. If motion of the object is sensed by the touchless motion sensor in the second Sensing Unit 20 within the predetermined time period Δt, the method proceeds to reference numeral 140 where the FSU-to-SSU motion output is enabled and the SSU-to-FSU motion output is disabled.

The method then enters a delay period at reference numeral 142. The delay time period is long enough for whatever device has been enabled by the output of the first Sensing Unit 14 to perform its assigned task. This delay time period will depend on the cycle time of the particular device that is being enabled. After the delay period, the method returns to reference numeral 134 where the FSU-to-SSU and SSU-to-FSU motion outputs are disabled.

If at reference numeral 136 no object motion was sensed by the first touchless motion sensor 12 in the first Sensing Unit 14, the method proceeds to reference numeral 144 where a decision is made whether or not the second touchless motion sensor 18 coupled to the second Sensing Unit 20 has detected the motion of an object within a sensing range of the touchless motion sensor in the second Sensing Unit 20. If not, the method returns to reference numeral 136. If the second touchless motion sensor 18 coupled to the second Sensing Unit 20 has detected the motion of an object within a sensing range of the touchless motion sensor coupled to the second Sensing Unit 20, the method proceeds to reference numeral 146 where it is determined whether the object motion is next sensed by the first touchless motion sensor 12 coupled to the first Sensing Unit 14 within a predetermined time period Δt. As previously indicated, the predetermined time period Δt is provided to minimize or eliminate false triggering by requiring that the object motion is sensed by the touchless motion sensor coupled to the first Sensing Unit 14 during an interval which corresponds to a deliberate action.

If the object motion is not sensed by the first touchless motion sensor 12 coupled to the first Sensing Unit 14 within the predetermined time period Δt, the sensing by the second Sensing Unit 20 is determined to be a false sensing and the method returns to reference numeral 136. If the object motion is sensed by the first touchless motion sensor 12 in the first Sensing Unit 14 within the predetermined time period Δt, the method proceeds to reference numeral 148 where the FSU-to-SSU motion output of the first Sensing Unit is disabled and the SSU-to-FSU motion output of the Second Sensing Unit is enabled.

The method then enters a delay period at reference numeral 150. The delay time period is long enough for whatever device has been enabled by the output of the second Sensing Unit 20 to perform its assigned task. This delay time period will depend on the cycle time of the particular device that is being enabled. After the delay period, the method returns to reference numeral 134 where the FSU-to-SSU and SSU-to-FSU motion detected outputs are disabled.

The method 130 shown in FIG. 5 enables the motion detected output of one of the first Sensing Unit 14 and the second Sensing Unit 20 depending on the direction of the motion of the sensed object and may be used in applications where it is desired to perform one of two control functions. A non-limiting example of an application of the method performed by the circuit system of FIG. 1 is controlling which one of the up and down call buttons of an elevator is activated by a user waving a hand in an upward motion or a downward motion. Persons skilled in the art will observe that providing additional sensors to resolve additional directions of motion will permit the implementation of more than two control functions.

Figure 6:
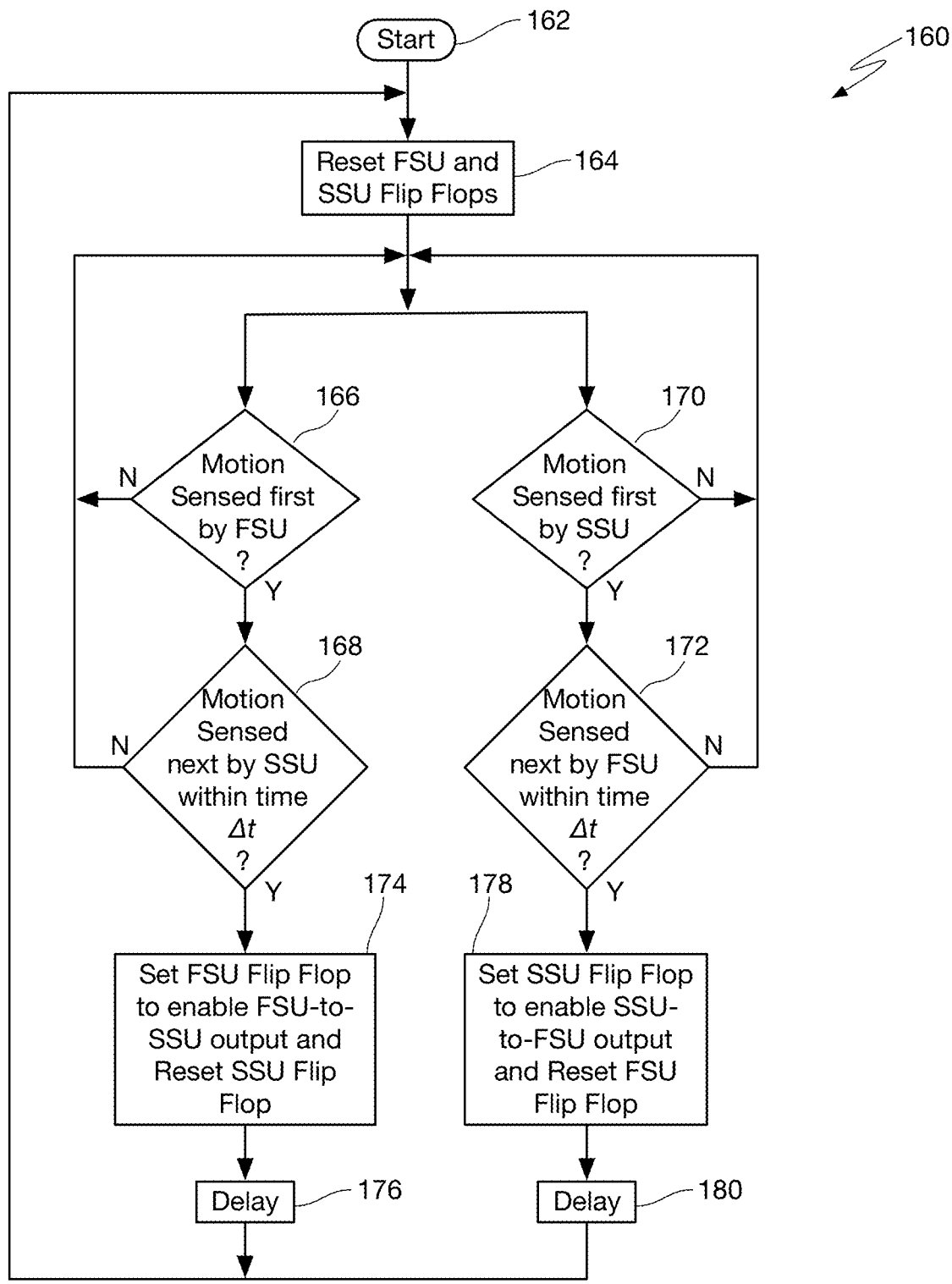
FIG. 6 is a flow diagram showing an illustrative method for performing directional detection and control in accordance with an aspect of the present invention.

Referring now to FIG. 6, a flow diagram shows an illustrative method 160 for performing directional detection in accordance with an aspect of the present invention. In one non-limiting embodiment of the invention, the method of FIG. 6 may be performed using the touchless motion sensor circuit system 30 depicted in FIG. 2. The method of FIG. 6 may also be performed using touchless motion sensor circuit systems other than the one depicted in FIG. 2. One non-limiting example of an application of the method 160 of FIG. 6 is the moving of a gurney through a door or set of doors into or out of an operating room or other area. The method starts at reference numeral 162.

At reference numeral 164, the flip flops 50 and 54 of the first Sensing Unit (FSU) 14 and the second Sensing Unit (SSU) 20 are reset. Following the reset, sensing of object motion in both directions is performed. At reference numeral 166 a decision is made whether or not the touchless motion sensor 12 coupled to the first Sensing Unit 14 has detected the motion of an object within a sensing range of the first touchless motion sensor 12 in the first Sensing Unit 14. If so, the method proceeds to reference numeral 168 where it is determined whether the object motion is next sensed by the second touchless motion sensor 18 in the second Sensing Unit 20 within a predetermined time period Δt. The predetermined time period Δt is provided to minimize or eliminate false triggering by requiring that the object motion is sensed by the second touchless motion sensor 18 in the second Sensing Unit 20 during an interval which corresponds to a deliberate action. For example, if the deliberate action is a hand waving across the sensors, the predetermined time period Δt will usually be less than 1 second. If the deliberate action is motion of a person toward a door or gate, the predetermined time period Δt will usually be less than 10 seconds, depending on the spacing between the first touchless motion sensor 12 and the second touchless motion sensor 18.

If the object motion is not sensed by the touchless motion sensor in the second Sensing Unit 20 within the predetermined time period Δt at reference numeral 168, the sensing by the first Sensing Unit 14 is determined to be a false sensing and the method returns to reference numerals 166 and 170. If the object motion is sensed by the second touchless motion sensor 18 in the second Sensing Unit 20 within the predetermined time period Δt, the method proceeds to reference numeral 174 where the first Sensing Unit Flip Flop 50 is set to enable the FSU-to-SSU motion detected output and the Second Sensing Unit Flip Flop 54 is reset to inhibit the SSU-to-FSU motion detected output. The method then proceeds to a delay at reference numeral 176 before returning to reference numerals 166 and 170. The delay time period is long enough for whatever device has been enabled by the FSU-to-SSU motion detected output of the First Sensing Unit to perform its assigned task. This delay time period will depend on the cycle time of the particular device that is being enabled. After the delay period, the method returns to reference numeral 164.

At reference numeral 170 a decision is made whether or not the touchless motion sensor in the Second Sensing Unit has detected the motion of an object within a sensing range of the touchless motion sensor in the Second Sensing Unit. If so, the method proceeds to reference numeral 172 where it is determined whether the object motion is next sensed by the touchless motion sensor in the first Sensing Unit within a predetermined time period Δt. The predetermined time period Δt is provided to minimize or eliminate false triggering by requiring that the object is sensed by the touchless motion sensor in first Sensing Unit during an interval which corresponds to a deliberate action. For example, if the deliberate action is a hand waving across the sensors, the predetermined time period Δt will usually be less than 1 second. If the deliberate action is motion of a person toward a door or gate, the predetermined time period Δt will usually be less than 10 seconds, depending on the spacing between the first Sensing Unit and the second Sensing Unit.

If the object motion is not sensed by the touchless motion sensor in the first Sensing Unit 14 within the predetermined time period Δt at reference numeral 172, the sensing by the first Sensing Unit is determined to be a false sensing and the method returns to reference numeral 166 and 170. If the object motion is sensed by the touchless motion sensor in the first Sensing Unit 14 within the predetermined time period Δt, the method proceeds to reference numeral 178 where the second Sensing Unit Flip Flop 54 is set to enable the SSU-to-FSU motion detected output and the first Sensing Unit Flip Flop 50 is reset to inhibit the FSU-to-SSU motion detected output. The method then proceeds to a delay at reference numeral 180 before returning to reference numerals 166 and 170. The delay time period is long enough for whatever device has been enabled by the SSU-to-FSU motion detected output of the second Sensing Unit to perform its assigned task. This delay time period will depend on the cycle time of the particular device that is being enabled. After the delay period, the method returns to reference numeral 164.

Figure 7:
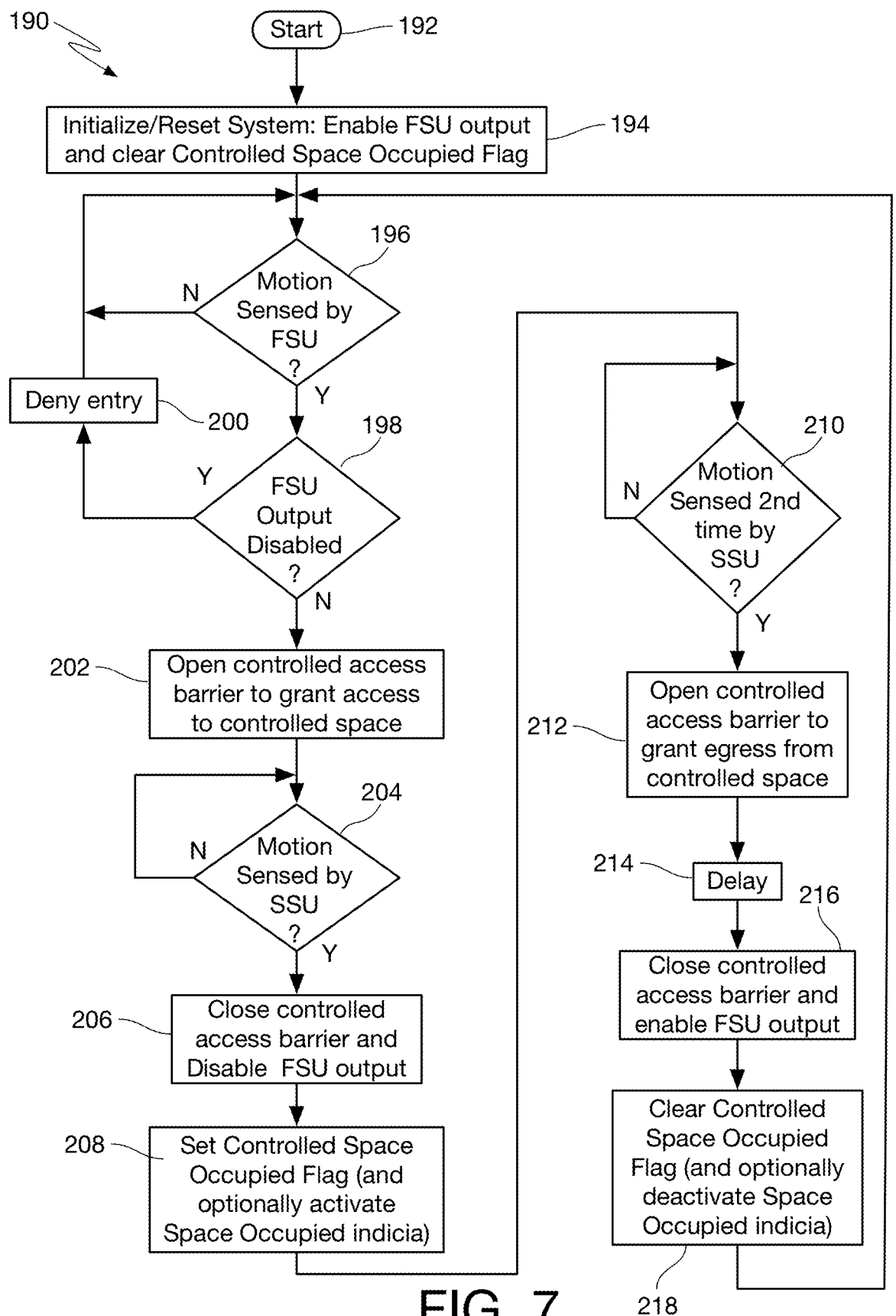
FIG. 7 is a flow diagram showing an illustrative method for providing access control in accordance with an aspect of the present invention.

Referring now to FIG. 7, a flow diagram shows an illustrative method 190 for providing access to a controlled space in accordance with an aspect of the present invention. One non-limiting example of an application of the method 180 is controlling access to a room such as a public restroom, a voting booth, or other enclosed space to allow only one person at a time to be granted access to the space. The method can be performed, for example, using the sensor circuit system 50 depicted in FIG. 3. The method starts at reference numeral 192.

At reference numeral 194 the system is initialized or reset by enabling the first sensing unit (FSU) and clearing a controlled space occupied flag. The controlled space occupied flag is optional and may provide a visual or other indicia that the controlled space is occupied. At reference numeral 196 a decision is made whether or not the touchless motion sensor in the first Sensing Unit has detected motion of an object within a sensing range of the touchless motion sensor in the first Sensing Unit. If no object motion is sensed the method returns to reference numeral 196 to continually poll the touchless motion sensor in the first Sensing Unit.

If motion of an object is sensed by the touchless motion sensor in the first Sensing Unit which is located at an entrance to the controlled space, the method proceeds to reference numeral 198 where a decision is made whether the output of the first Sensing Unit has been disabled. If the output of the first Sensing Unit has been disabled, the method proceeds to reference numeral 200, where entry into the controlled space is denied and the method again returns to polling the touchless motion sensor of first Sensing Unit at reference numeral 196.

If at reference numeral 198 it is decided that the first Sensing Unit is not in a disabled state, the method proceeds to reference numeral 202 where access to the controlled space is granted by opening a controlled access barrier to the controlled space, e.g., a door or gate.

The method then proceeds to reference numeral 204 where a decision is made whether or not the touchless motion sensor in the second Sensing Unit (SSU) located within the controlled space has detected motion of an object within a sensing range of the touchless motion sensor in the second Sensing Unit. If no object motion is sensed the method returns to reference numeral 204 to continually poll the touchless motion sensor in second Sensing Unit.

When at reference numeral 204 the touchless motion sensor in the second Sensing Unit has detected the motion of an object within a sensing range of the touchless motion sensor in second Sensing Unit the method proceeds to reference numeral 206 where the controlled access barrier is closed and the output of the first sensing unit is disabled to prevent an additional access to the controlled space. The method then proceeds to reference numeral 208 where an optional controlled space occupied flag may then be set. Optionally a space occupied indicia may be activated.

The method then proceeds to reference numeral 210 where it polls the second Sensing Unit until motion of an object within a sensing range of the touchless motion sensor in the second Sensing Unit is detected for a second time. Detection of motion of an object within a sensing range of the touchless motion sensor in the second Sensing Unit for a second time can indicate that a person within the controlled space wishes to exit the controlled space.

When motion of an object within a sensing range of the touchless motion sensor in the second Sensing Unit is detected for the second time the method proceeds to reference numeral 212, where the egress from the controlled space is granted by opening the controlled access barrier to the controlled space, e.g., the door or gate is opened to allow the person to exit the controlled space. After a delay at reference numeral 214 long enough to allow the person to exit the controlled space, the method proceeds to reference numeral 216 where the controlled access barrier to the controlled space is closed and the output of the first sensing unit is again enabled. The method then proceeds to reference numeral 218 where the optional controlled space occupied flag may then be cleared. If the optional space occupied indicia was activated, it can be deactivated in response to the controlled space occupied flag being cleared.

The method then returns to reference numeral 196 to poll the first sensing unit for motion of an object.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A touchless motion sensor system for performing directional motion detection, comprising:
    a first touchless motion sensor having an output;
    a first sensing unit coupled to the first touchless motion sensor, the first sensing unit including a first sensing unit disable input, a first sensing unit disable output, a first sensing unit to second sensing unit motion detected output, and motion logic coupled to the output of the first touchless motion sensor, the first sensing unit disable input, and to the first sensing unit to second sensing unit motion detected output;
    a second touchless motion sensor having an output, the second touchless motion sensor separated from the first touchless motion sensor by a predetermined distance along a predefined axis;

a second sensing unit coupled to the second touchless motion sensor, the second sensing unit including a second sensing unit disable input, a second sensing unit disable output, a second sensing unit to first sensing unit motion detected output, and motion logic coupled to the output of the second touchless motion sensor, the second sensing unit disable input, and to the first sensing unit to second sensing unit motion detected output;
the first sensing unit disable output coupled to the second sensing unit disable input; and
the second sensing unit disable output coupled to the first sensing unit disable input.

2. The touchless motion sensor system of claim 1 wherein:
the first sensing unit to second sensing unit motion detected output is a latched output; and
the second sensing unit to first sensing unit motion detected output is a latched output.

3. The touchless motion sensor system of claim 2 wherein:
the latched output of the first sensing unit to second sensing unit motion detected output is an output from a first flip flop; and
the latched output of the second sensing unit to first sensing unit motion detected output is an output from a second flip flop.

4. The touchless motion sensor system of claim 3 further including a common sensing unit reset input coupled to a reset input of the first flip flop and to a reset input of the second flip flop.

5. The touchless motion sensor system of claim 1 wherein the predefined axis is aligned along one of a horizontal and a vertical direction.

6. A touchless motion sensor system for providing access control to a controlled space having a controllable access barrier, the touchless motion sensor system comprising:
a first touchless motion sensor disposed outside of the controlled space, the first touchless motion sensor having an output;
a first sensing unit coupled to the output of the first touchless motion sensor, the first sensing unit including a first sensing unit motion detected output;
a second touchless motion sensor disposed within the controlled space, the second touchless motion sensor having an output;
a second sensing unit coupled to the output of the second touchless motion sensor, the second sensing unit including a second sensing unit motion detected output;
a controller coupled to the first sensing unit motion detected output and to the second sensing unit motion detected output of the first and second sensing units, the controller coupled to the controllable access barrier and configured to:
initialize the touchless motion sensor system by enabling the first sensing unit; and
operate the touchless motion sensor system to open the controlled access barrier in response to motion sensed by the first sensing unit only if the first sensing unit is enabled, then close the controllable access barrier and disable the first sensing unit in response to motion sensed a first time by the second sensing unit; and to open the controllable access barrier and enable the first sensing unit in response to motion sensed a second time by the second sensing unit.

7. The touchless motion sensor system of claim 6 wherein the controller is further configured to:

set a controlled space occupied flag in response to the motion sensed the first time by the second sensing unit;
after opening the controllable access barrier in response to motion sensed the second time by the second sensing unit, close the controllable access barrier and enable the first sensing unit and clear the controlled space occupied flag.

8. The touchless motion sensor system of claim 6 wherein the controlled space is a room and the controllable access barrier is a door providing access to the room.

9. A method for performing directional motion detection comprising:
providing a first touchless motion sensor coupled to a first sensing unit;
providing a second touchless motion sensor coupled to a second sensing unit, the second touchless motion sensor spaced apart from the first touchless motion sensor at a predetermined distance along a predetermined axis;
sensing motion by one of the first and second touchless motion sensors first before sensing motion by the other one of the first and second touchless motion sensors;
activating a first sensing unit to second sensing unit motion detector output of the first sensing unit and inhibiting a second sensing unit to first sensing unit motion detector output of the second sensing unit if the motion was sensed first by the first touchless motion sensor; and
activating the second sensing unit to first sensing unit motion detector output of the second sensing unit and inhibiting the first sensing unit to second sensing unit motion detector output of the first sensing unit if the motion was sensed first by the second touchless motion sensor.

10. The method of claim 9 wherein:
activating the first sensing unit to second sensing unit motion detector output of the first sensing unit and inhibiting the second sensing unit to first sensing unit motion detector output of the second sensing unit if the motion was sensed first by the first touchless motion sensor occurs only if the motion is sensed by the second touchless motion sensor within a predetermined time interval following the motion being sensed by the first touchless motion sensor; and
activating the second sensing unit to first sensing unit motion detector output of the second sensing unit and inhibiting the first sensing unit to second sensing unit motion detector output of the first sensing unit if the motion was sensed first by the second touchless motion sensor occurs only if the motion is sensed by the first touchless motion sensor within a predetermined time interval following the motion being sensed by the second touchless motion sensor.

11. The method of claim 10 wherein the predetermined time interval is less than 1 second.

12. The method of claim 10 wherein the predetermined time interval is less than 10 seconds.

13. A method for operating touchless motion sensor system for providing access control to a controlled space having a controllable access barrier, comprising:
providing a first touchless motion sensor coupled to a first sensing unit, the first touchless sensor disposed outside of the controlled space;
providing a second touchless motion sensor coupled to a second sensing unit, the second touchless motion sensor disposed inside of the controlled space;

initializing the touchless motion sensor system by enabling control of the controlled access barrier from motion sensed by the first touchless motion detector;

after initializing the touchless motion sensor system, operating the touchless motion sensor system by:

sensing motion by the first touchless motion sensor;

opening a controlled access barrier to the controlled space in response to the motion sensed by the first touchless motion sensor;

sensing motion a first time by the second touchless motion sensor after the controllable access barrier has been opened;

closing the controllable access barrier in response to the motion sensed by the second touchless motion sensor; and disabling control of the controllable access barrier from motion sensed by the first touchless motion detector after closing the controllable access barrier.

14. The method of claim 13, further comprising:

sensing motion a second time by the second touchless motion sensor after the controllable access barrier has been closed;

opening the controlled access barrier in response to the motion sensed the second time by the second touchless motion sensor after the controllable access barrier has been closed;

closing the controllable access barrier following a preselected time delay following the opening of the controllable access barrier in response to the motion sensed the second time by the second touchless motion sensor; and enabling control of the controllable access barrier from motion sensed by the first touchless motion detector after closing the controllable access barrier following the preselected time delay.

15. The method of claim 13 further comprising setting a controlled space occupied flag after closing the controllable access barrier in response to the motion sensed by the second touchless motion sensor.

16. The method of claim 15 further comprising activating a controlled space occupied indicia in response to setting the controlled space occupied flag.

17. The method of claim 14 further comprising setting a controlled space occupied flag after closing the controlled access barrier in response to the motion sensed by the second touchless motion sensor.

18. The method of claim 17 further comprising clearing the controlled space occupied flag after closing the controlled access barrier following the preselected time delay.

19. The method of claim 18 further comprising deactivating the controlled space occupied indicia in response to clearing the controlled space occupied flag.

* * * * *